(12) United States Patent
Myatt

(10) Patent No.: US 7,446,718 B2
(45) Date of Patent: Nov. 4, 2008

(54) SYSTEM FOR WIRELESS DATA COMMUNICATION BETWEEN A VEHICLE AND ITS TIRE

(75) Inventor: David Myatt, Chateaugay (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 251 days.

(21) Appl. No.: 11/314,931

(22) Filed: Dec. 20, 2005

(65) Prior Publication Data

US 2006/0137788 A1    Jun. 29, 2006

(30) Foreign Application Priority Data

Dec. 23, 2004    (EP)    ................... 04293110

(51) Int. Cl.
*H01Q 1/32* (2006.01)
(52) U.S. Cl. ........................... 343/711
(58) Field of Classification Search ......... 343/711–713; 340/447; 152/361 DM
See application file for complete search history.

(56) References Cited

U.S. PATENT DOCUMENTS

| | | | |
|---|---|---|---|
| 3,786,851 A * | 1/1974 | Mirtain et al. ............... | 152/527 |
| 3,850,219 A * | 11/1974 | Snyder ......................... | 152/531 |
| 3,973,612 A * | 8/1976 | Mezzanotte ................... | 152/529 |
| 4,911,217 A * | 3/1990 | Dunn et al. .............. | 152/152.1 |
| 5,181,975 A * | 1/1993 | Pollack et al. ............ | 152/152.1 |
| 5,520,231 A | 5/1996 | Myatt et al. | |
| 5,922,154 A * | 7/1999 | Lowenhaupt et al. ........ | 152/531 |
| 6,581,657 B1* | 6/2003 | Brown ....................... | 152/152.1 |
| 6,630,910 B2 | 10/2003 | Forster et al. | |
| 6,842,151 B2* | 1/2005 | Tenten ......................... | 343/711 |
| 6,933,898 B2* | 8/2005 | Nantz et al. .................. | 343/711 |
| 7,180,410 B2* | 2/2007 | Logan et al. ................. | 340/447 |
| 7,250,914 B2* | 7/2007 | Kish et al. ................... | 343/711 |
| 2002/0113692 A1 | 8/2002 | Normann et al. | |
| 2003/0156067 A1 | 8/2003 | Tenten | |
| 2006/0137788 A1* | 6/2006 | Myatt ....................... | 152/152.1 |

FOREIGN PATENT DOCUMENTS

| EP | 0 389 406 B1 | 8/1994 |
|---|---|---|
| EP | 0 689 950 A | 1/1996 |
| EP | 0 875 405 A1 | 11/1998 |

\* cited by examiner

*Primary Examiner*—Huedung Cao Mancuso
(74) *Attorney, Agent, or Firm*—Cohen Pontani Lieberman & Pavane LLP

(57) ABSTRACT

A system for wireless data communication between a vehicle and at least one of its tires (10), the system comprising a fixed antenna mounted on the vehicle and an antenna integral with the tire (10), the latter antenna being located in proximity with the tire's (10) belt. The characteristics of the tire belt are chosen in order to achieve an increased transmission distance.

16 Claims, 3 Drawing Sheets

SYSTEM FOR WIRELESS DATA COMMUNICATION BETWEEN A VEHICLE AND ITS TIRE

FIELD OF INVENTION

The present invention concerns systems for wireless data communication between a vehicle and its tires.

DEFINITIONS

In the present document:
"cord" is understood to mean a single thread or wire, metallic or non metallic, or an assembly of several threads or wires;
"ply" refers to a layer of parallel reinforcing cords, metallic or non metallic, woven or unwoven, and embedded in a rubber composition, the thickness of the ply being close to the diameter of an individual cord;
"belt" refers to an assembly of at least one ply that is unanchored to the bead;
"axial" refers to a direction essentially parallel to the rotation axis of a tire
"radial" refers to a direction parallel to a vector perpendicular to the axial direction and which intersects the rotation axis of the tire

BACKGROUND OF INVENTION

The wireless communication of data between a vehicle and its tires is a major field of development in the automotive industry; numerous applications concerning both tire identification and the transmission of tire parameters such as tire pressure, tire temperature, tire rotational speed, or forces acting on the tire, have been developed.

One of the parameters limiting the development of such applications is the attenuation of the electromagnetic signal between the high frequency transmitter circuit and the receiving unit, which leads to a reduction of the transmission distance. A signal transmitted from or to the tire is attenuated by the cumulative effect of the rubber composition layers and steel belts. As mentioned in the patent application US 2002/0113692, the wheel rim, the steel belts in the tire and fillers in the rubber composition of the tire attenuate the signals so heavily that the antennas of the interrogator and of the responder must be arranged in close proximity to each other.

It has been suggested to take advantage the strong absorption of the electromagnetic waves in metallic components of the tire by using the latter as parts of the data transmission system: EP 0 389 406 describes a tire comprising a transponder that is capacitively coupled to a belt or breaker ply reinforced with steel cord; EP 0 875 405 discloses the use of a conductive wire in a jointless belt as the transmitting and receiving antenna of the transponder; U.S. Pat. No. 6,630,910 teaches that the coupling of a wave antenna to an inner steel belt can be direct, capacitive, or reactive.

Moreover, it has been observed that the electromagnetic field that penetrates into a tire is influenced by an electrically conductive belt and bent around the belt, thus yielding a distribution of the energy of the radio-wave field along the entire periphery of the belt. Patent application US 2003/0156067 therefore describes the use of the whole steel belt of a tire as an <<intermediate or auxiliary antenna>>. Such use of the belt opens interesting areas of application, but the very nature of the steel belts used in tires does not make them suitable candidates for all types of applications. If another type of antenna is to be used and has to be arranged close to the steel belt, the attenuation of the electromagnetic energy by the belt presents a serious problem and dramatically reduces the transmission distance mentioned above. In certain cases the distance is reduced to less than 50% of the distance that could be obtained with the same transmission circuit outside the tire.

SUMMARY OF THE INVENTION

The present invention aims to increase the transmission distance of a system for data communication between a vehicle and at least one of its tires, the system comprising a fixed antenna mounted on the vehicle and an antenna integral with the tire, the latter antenna being located in proximity with the tire's belt, i.e. in the crown or in the sidewall of the tire. This goal is achieved by modifications of the structure of the tire's belt.

According to one preferred embodiment of the invention, the transmission distance is increased through the use of a belt comprising at least one breaker ply that is free of metallic components. Preferentially, at most one breaker ply comprises metallic elements. Even more preferentially, all the breaker plies of the tire's belt are free of metallic components.

According to another preferred embodiment of the invention, the transmission distance is increased through the use of a belt that comprises only one single breaker ply.

According to a third preferred embodiment of the invention, the transmission distance is increased through the use of a belt being characterized in that
at least one of the breaker plies is made up of metallic cords that are inclined by an angle $\alpha$ (alpha) with respect to the circumferential direction
the length of the cords does not exceed 75% of the width of the breaker ply; and
the minimum distance between two cords is greater than or equal to twice the diameter of the cords.

According to a fourth preferred embodiment of the invention, the transmission distance is increased through the use of a belt that consists of at least two breaker plies made up of metallic cords, the minimum radial distance between adjacent breaker plies being greater than or equal to twice the diameter of the cords.

According to a fifth preferred embodiment of the invention, the transmission distance is increased through the use of a belt that consists of at least two breaker plies separated by a layer of rubber composition, the resistance between any cord of a breaker ply and any cord of an adjacent breaker ply being greater than 20 k$\Omega$ The resistance measurement is to be carried out on a slice obtained from the tire by cutting the tire twice along a radial direction such that the slice has a width of 5 cm, the width being measured on the surface of the tread along the circumferential direction (i.e. the direction which is perpendicular both to the axial and radial directions of the tire).

According to a sixth preferred embodiment of the invention, the transmission distance is increased through the use of a belt that consists of at least two breaker plies separated by a layer of rubber composition, such that the capacity between any cord of a breaker ply and any cord of an adjacent breaker ply is less than 1 nF. The capacity measurement is to be carried out on a slice obtained from a tire by cutting the tire twice along a radial direction such that the slice has a width of 5 cm, the width being measured on the surface of the tread along the circumferential direction According to a seventh preferred embodiment of the invention, the transmission distance is increased through the use of a belt that consists of at least two breaker plies, the metallic cords of the breaker plies being inclined by an angle that is greater than 30 degrees with respect to the circumferential direction.

According to a eighth preferred embodiment of the invention, the transmission distance is increased through the use of a belt wherein the laying pitch of the metallic cords of the breaker plies of the belt is greater than twice the diameter of the cords.

According to an ninth preferred embodiment of the invention, the transmission distance is increased through the use of a belt wherein the diameter of the metallic cords of the belt's breaker plies is greater than 0.8 mm According to a tenth preferred embodiment of the invention, the transmission distance is increased through the use of a belt wherein the high frequency resistance of the cords of the belt's breaker plies is greater than 50 Ω/m at a frequency of 13.56 MHz. However, it should be noted that the present invention is not limited to a given transmission frequency.

Of course it is possible or even desirable to combine the characteristics of several embodiments in order to obtain a system with increased transmission distance for a chosen frequency of electromagnetic radiation.

BRIEF DESCRIPTION OF THE DRAWINGS

The invention may be better understood by reference to the detailed description which follows and to the drawings, in which.

DESCRIPTION OF THE PREFERRED EMBODIMENTS

Figure 1:
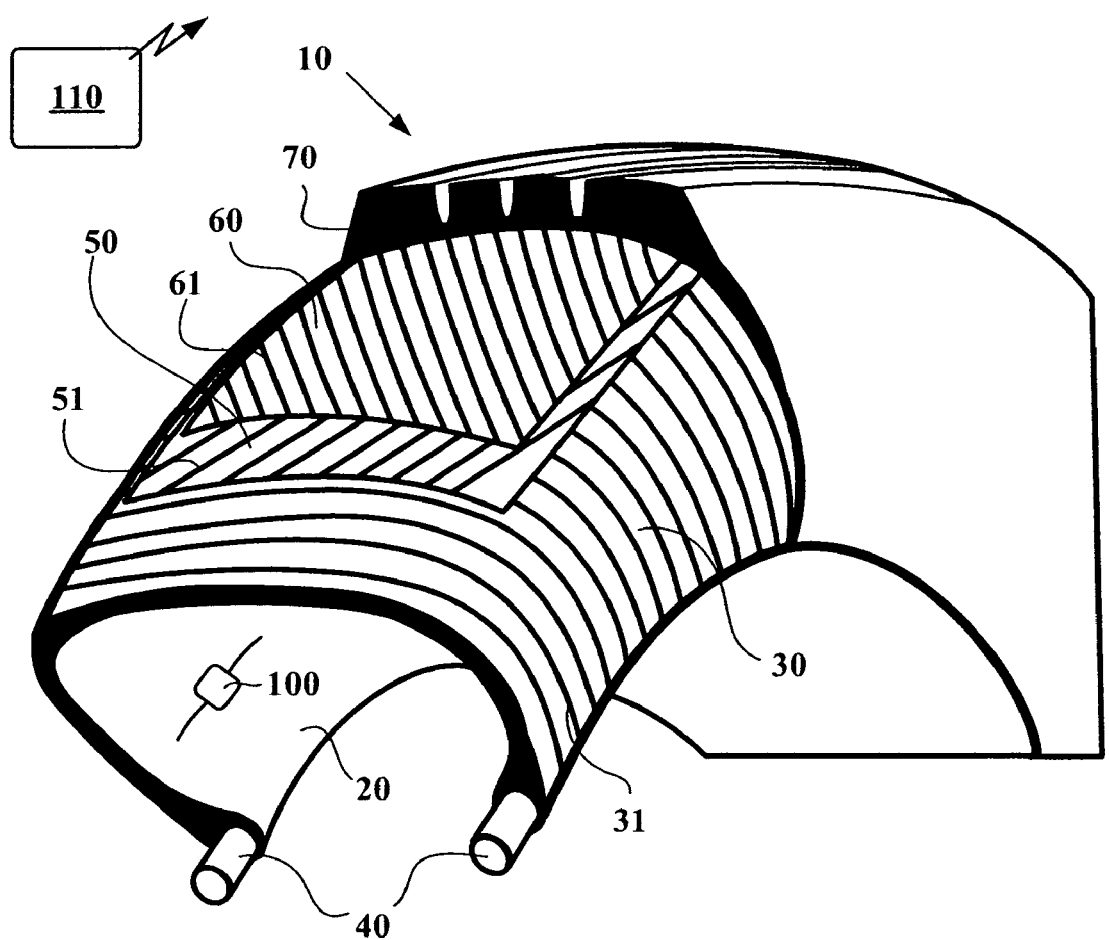
FIG. 1 is a schematic view of a pneumatic radial tire

FIG. 1 schematically represents the structure of a radial pneumatic tire 10 comprising an inner liner 20 made of airtight synthetic rubber, a carcass ply 30 composed of textile cords 31, laid down in straight lines and sandwiched in rubber, bead wires 40 holding the tire 10 onto the rim (not illustrated), a breaker belt made of at least two radially adjacent breaker plies 50 and 60, and a tread 70 laid over the breaker plies 50 and 60 to be in contact with the road. Each of the two breaker plies 50 and 60 of tire 10 is reinforced with steel cords 51 and 61 that are inclined with respect to the equatorial plane of the tire at an appropriate angle (typically around 20.degree.), the cords 51 of one ply being inclined oppositely to the cords 61 of the other ply. An antenna 100 is integrated with the tire 10 and located in proximity with the tire belt. Another fixed antenna 110 is provided and mounted on the vehicle.

Figure 2:
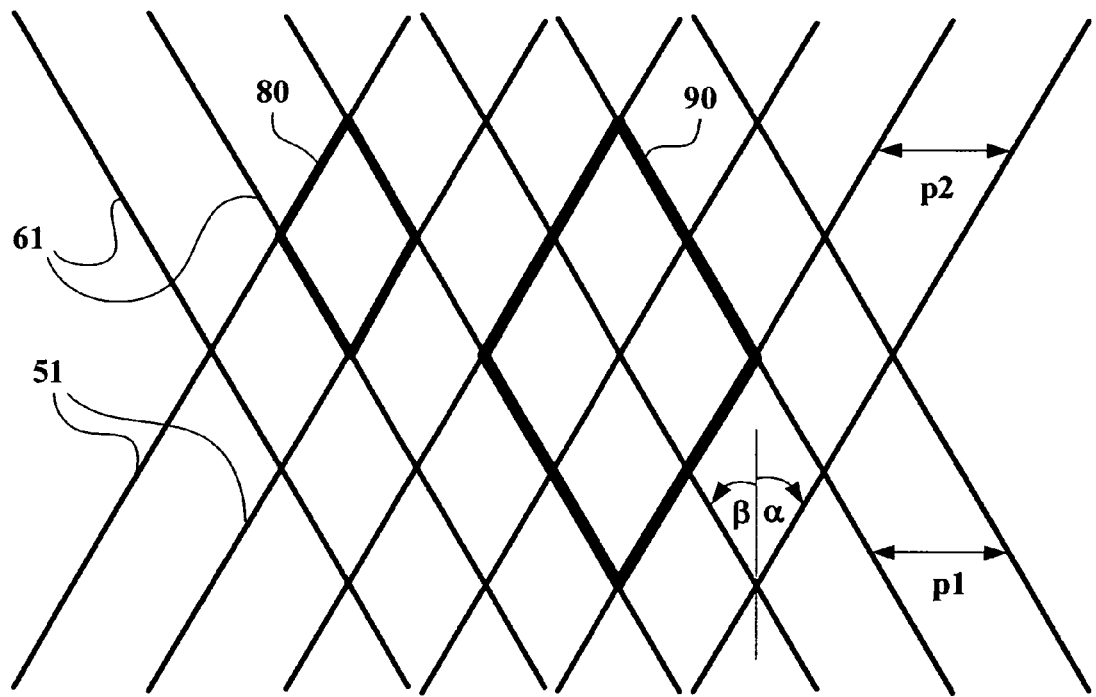
FIG. 2 is a schematic representation of the lattice formed by the cords of two breaker plies.

This particular arrangement of the plies comprised in the breaker belt explains the strong absorption of electromagnetic radiation in the belt. As schematically represented in FIG. 2, the sets of cords 51 and 61 of the adjacent plies 50 and 60 form a lattice comprising a great number of elementary 80 and composite 90 parallelograms.

Figure 3:
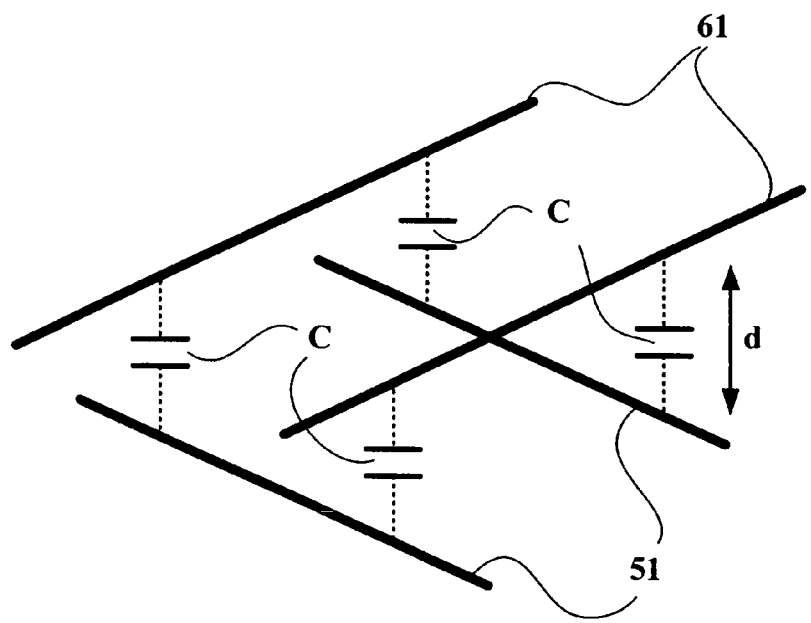
FIG. 3 is a schematic representation of a resonant circuit formed by the cords of two adjacent breaker plies.
Figure 4:
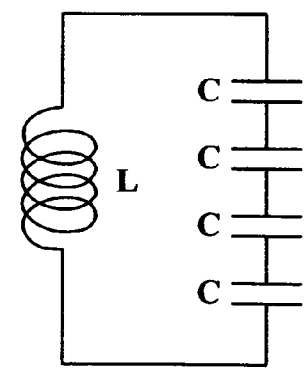
FIG. 4 is a schematic representation of the resonant circuit corresponding to the arrangement of FIG. 3.

As shown in FIG. 3, each of these parallelograms constitutes a resonant circuit: the four sides of the parallelogram formed by parts of cords of the belt can be considered as a loop of inductance L, whereas the cord-rubber composition-cord interface at each of the angles of the parallelogram constitutes a capacity C. FIG. 4 shows the equivalent LC circuit.

Figure 5:
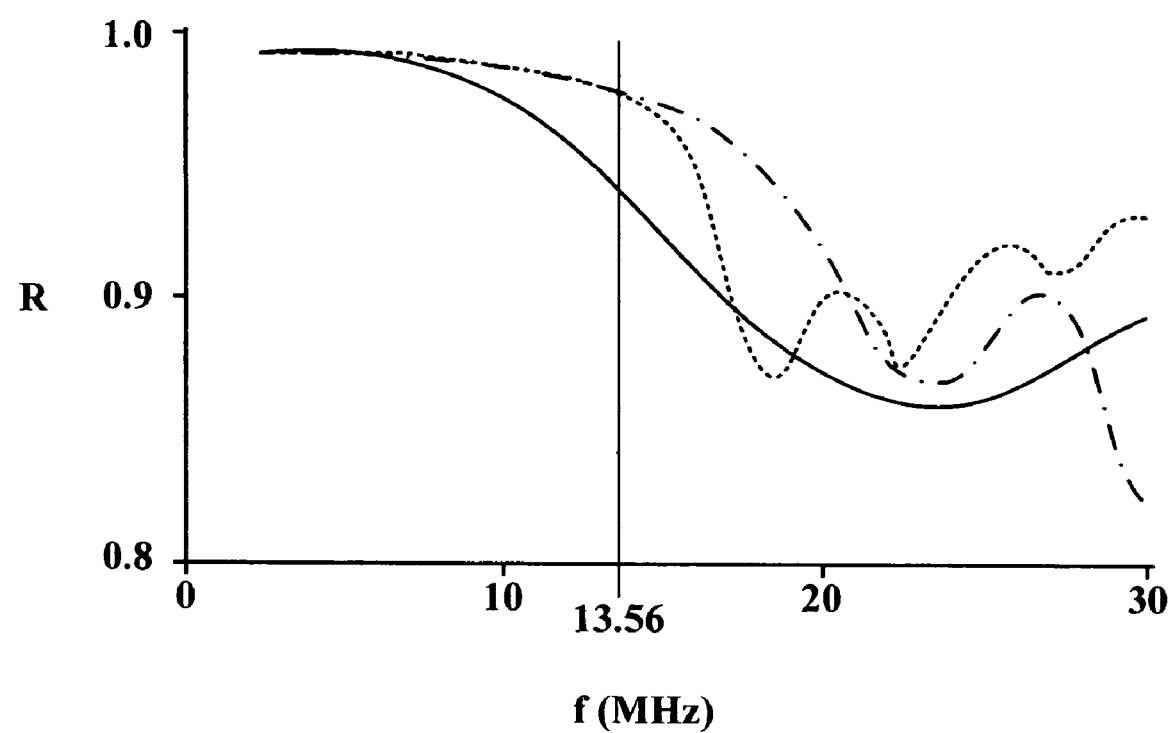
FIG. 5 is a graph illustrating the frequency dependence of the absorption of electromagnetic energy in different breaker plies.

As it is well known, a resonant circuit can be excited by electromagnetic radiation of a frequency that is close to its resonant frequency. The more circuits are excited, the stronger the electromagnetic radiation is absorbed. The great number of circuits of varying shapes (and, therefore, of varying inductance L) present in the belt of a tire explains the fact that the absorption function is of complex shape. FIG. 5 shows measurements of the reflectance of a standard tire (solid line) as a function of the frequency of the electromagnetic radiation that is reflected. The more the value departs from 1, the more energy is absorbed in the belt. It can be seen that absorption becomes significant at frequencies beyond about 8 MHz. At frequencies that are used for transponders in tires, much of the energy is absorbed: for instance, at 13.56 MHz, absorption is such that the transmission distance is about half of what it would be were there no breaker plies in the tire.

The aim of the present invention is to provide a system for data communication between a vehicle and its tires with an increased transmission distance. This goal is achieved by modifying the tire so as to shift the frequency from which on absorption becomes notable to values beyond the frequency that is used by the communication means. This is done by modifying the capacity and inductance of the resonant circuits constituted by the belt. The following characteristics of the belt can be modified to this aim:

(1) the nature of the cords 51 and 61 used in the breaker plies 50 and 60: if non metallic cords are used in all of the breaker plies except one, there are no resonant circuits as explained above and absorption is strongly reduced. Of course, there is even less absorption if all the plies are made of exclusively non metallic cords.

(2) the number of plies: if there is only one reinforced ply, absorption is reduced for the same reason: there is no lattice of resonant circuits formed.

(3) the structure of the plies 50 and 60: the number of resonant circuits of low resonant frequency can be strongly reduced by replacing each metallic cord 51 or 61 by a number of short cords separated by a minimum distance of rubber composition.

(4) the distance between adjacent breaker plies 50 and 60: the capacity of the resonant circuits formed by metallic cords 51 and 61 of the belt critically depends on this distance. In FIG. 5, the dashed-dotted line corresponds to a tire in which the breaker plies 50 and 60 have been separated by an additional skim of rubber composition. It can be seen that the absorption in the region of 13.56 MHz is strongly reduced in comparison to the reference tire (solid line).

(5) the resistivity of the rubber composition used in the breaker plies 50 and 60: this is another way of modifying the capacity of the resonant circuits. The dashed line in FIG. 5 corresponds to a tire where the conductivity of the rubber composition used in the breaker plies 50 and 60 has been increased. Again, the absorption in the region around 13.56 MHz is significantly reduced.

(6) the inclination of the cords 51 and 61 of the breaker plies 50 and 60 with respect to the circumference of the tire: if the angles α and β (FIG. 2) of metallic cords 51 and 61 are modified, the geometry of the loops of the resonant circuits, and, therefore, their inductance, is modified. FIG. 2 suggests identical values for α and β, but this is not necessarily so.

(7) the pitch of the breaker plies: another way of modifying the inductance of the resonant circuits formed by the metallic cords of the breaker belt is to change the pitch of at least one of the beaker plies. In FIG. 2 pitches p1 and p2 are identical, but this is not necessarily so.

(8) the diameter of metallic cords 51 and 61 and (9) the high frequency conductivity of the cords 51 and 61: these two parameters also influence the inductance of the resonant circuits.

Of course it is possible or even desirable to combine modifications of several of these parameters in order to obtain a system with increased transmission distance for a chosen frequency of electromagnetic radiation.

I claim:

1. A system for data communication between a vehicle and at least one of its tires, the tire comprising a belt comprising at least two breaker plies separated by a layer of rubber composition, the system comprising:
   a fixed antenna mounted on the vehicle; and
   an antenna integral with the tire, the latter antenna being located in proximity with the belt,
   wherein at least one of the breaker plies comprises non metallic cords.

2. The system according to claim 1, wherein at most one of the breaker plies comprises metallic cords.

3. The system of claim 1, wherein all the breaker plies of the belt comprise non metallic cords.

4. The system according to claim 1, wherein all breaker plies are free of metallic components.

5. The system according to claim 1, wherein at least one of the breaker plies is made up of metallic cords.

6. The system according to claim 5, wherein the length of the metallic cords is equal to or less than a width the breaker ply made up of metallic cords.

7. The system according to claim 5, wherein minimum distance between the metallic cords is greater than or equal to twice the diameter of the metallic cords.

8. A system for data communication between a vehicle and at least one of its tires, the tire comprising a belt comprising at least two breaker plies separated by a layer of rubber composition, the system comprising:
   a fixed antenna mounted on the vehicle; and
   an antenna integral with the tire, the latter antenna being located in proximity with the belt,
   wherein the distance between adjacent breaker plies made up of metallic cords is greater than or equal to twice the diameter of the cords.

9. The system according to claim 8, wherein the metallic cords in the breaker plies are inclined by an angle greater than 30 degrees with respect to a circumferential direction of the tire.

10. The system according to claim 8, wherein the metallic cords in the breaker plies have a diameter greater than 0.8 mm.

11. The system according to claim 8, wherein the metallic cords in the respective breaker plies have a laying pitch greater than twice the diameter of the metallic cords.

12. The system according to claim 8, wherein the metallic cords in one of the breaker plies have a laying pitch different from that formed by metallic cords in another one of the breaker plies.

13. A system for data communication between a vehicle and at least one of its tires, the tire comprising a belt comprising at least two breaker plies separated by a layer of rubber composition, the system comprising:
   a fixed antenna mounted on the vehicle; and
   an antenna integral with the tire, the latter antenna being located in proximity with the belt,
   wherein the resistance between any cord of a breaker ply and any cord of an adjacent breaker ply is greater than 20 kΩ.

14. The system of claim 13, wherein the capacity between any cord of a breaker ply and any cord of an adjacent breaker ply is less than 1 nF.

15. A system for data communication between a vehicle and at least one of its tires, the tire comprising a belt comprising at least two breaker plies (50,60) separated by a layer of rubber composition, the system comprising:
   a fixed antenna mounted on the vehicle; and
   an antenna integral with the tire, the latter antenna being located in proximity with the belt,
   wherein the capacity between any cord of a breaker ply and any cord of an adjacent breaker ply is less than 1 nF.

16. A system for data communication between a vehicle and at least one of its tires, the tire comprising a belt comprising at least two breaker plies separated by a layer of rubber composition, the system comprising:
   a fixed antenna mounted on the vehicle; and
   an antenna integral with the tire, the latter antenna being located in proximity with the belt,
   wherein the frequency resistivity of the cords of the breaker plies is greater than 32 Ω/m at a frequency of 13.56 MHz.

* * * * *